(12) United States Patent
Ueno et al.

(10) Patent No.: US 7,909,513 B2
(45) Date of Patent: Mar. 22, 2011

(54) ROLLING BEARING DEVICE

(75) Inventors: Hiroshi Ueno, Tondabayashi (JP);
Kazuya Suzuki, Kashiwara (JP);
Hiroyuki Urano, Sakurai (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 758 days.

(21) Appl. No.: 11/884,269

(22) PCT Filed: Feb. 15, 2006

(86) PCT No.: PCT/JP2006/302644
§ 371 (c)(1),
(2), (4) Date: Aug. 14, 2007

(87) PCT Pub. No.: WO2006/088054
PCT Pub. Date: Aug. 24, 2006

(65) Prior Publication Data
US 2008/0069488 A1 Mar. 20, 2008

(30) Foreign Application Priority Data
Feb. 15, 2005 (JP) .................. P2005-037495

(51) Int. Cl.
*F16C 19/00* (2006.01)
*F16C 33/38* (2006.01)
(52) U.S. Cl. .............. 384/470; 384/473; 384/523
(58) Field of Classification Search .......... 384/93, 384/462, 465, 466, 468, 470, 471, 473, 474, 384/523, 606, 614, 623; 184/6.26
See application file for complete search history.

(56) References Cited

U.S. PATENT DOCUMENTS

| 2,838,348 | A | * | 6/1958 | Hamm | 384/466 |
| 3,450,449 | A | * | 6/1969 | Sibley et al. | 384/465 |
| 3,951,476 | A | * | 4/1976 | Schulien et al. | 384/385 |
| 4,932,500 | A | | 6/1990 | Smith et al. | |
| 6,371,655 | B1 | * | 4/2002 | Fierling | 384/523 |
| 7,293,919 | B2 | * | 11/2007 | Ueno et al. | 384/473 |
| 7,507,028 | B2 | * | 3/2009 | Markle | 384/523 |

FOREIGN PATENT DOCUMENTS

| JP | 26-14214 | | 12/1951 |
| JP | 26014214 | * | 12/1951 |
| JP | 3-172616 | | 7/1991 |
| JP | 11-173336 | | 6/1999 |

(Continued)

OTHER PUBLICATIONS

Translation of Kenji, JP11-173336.*
Translation of Kenji, JP11-173336, translated Apr. 2010.*

(Continued)

*Primary Examiner* — James Pilkington
(74) *Attorney, Agent, or Firm* — McGinn IP Law Group, PLLC (57) ABSTRACT

A groove is formed on one end face side of a cage including a plurality of pockets for holding individually rolling elements which extends circumferentially along a full circumference of the cage about a rotational center thereof and has a bottom portion which communicates individually with the plurality of pockets, and a distal end portion of a nozzle of an oil supply unit is inserted into the groove, whereby the generation of disturbance to airflow and negative pressure in the vicinity of an opening of the nozzle is suppressed when a rolling bearing rotates, so that lubricating oil supplied from the nozzle is allowed to reach the rolling elements in an ensured fashion.

3 Claims, 9 Drawing Sheets

FOREIGN PATENT DOCUMENTS

| | | | |
|---|---|---|---|
| JP | 11173336 | * | 6/1999 |
| JP | 2004-108388 | | 4/2004 |
| JP | 2004-316707 | | 11/2004 |
| WO | WO2004/025130 | * | 3/2004 |

OTHER PUBLICATIONS

Chinese Office Action dated Jan. 9, 2009 with English-Language Translation.

* cited by examiner

ROLLING BEARING DEVICE

TECHNICAL FIELD

The present invention relates to a rolling bearing device including a self-lubricating function.

BACKGROUND ART

Rolling bearings such as angular ball bearings are used for support of shafts which rotate at relatively high speed such as various types of spindles used on working tools. As lubricating methods for lubricating rolling bearings for supporting such spindles which rotate at high speed, conventionally, an oil-air lubricating method has mainly been used in many cases.

The oil-air lubricating method is a method for blowing a minute amount of lubricating oil which is intermittently supplied towards the rolling bearing through piping by virtue of compressed air, and in this method, since the lubricating oil is supplied to the bearing by being caused to forcibly pass through an air curtain formed around the rolling bearing which rotates at highs speed, the compressed air is used as a so-called carrier.

In the oil-air lubricating method like this, an oil-air lubricating device and a mixing valve, as well as a compressor and external piping are necessary externally of the spindle or the like in which the bearing, which is an object for lubrication, is incorporated, and in addition to this, passageways for oil and air need to be formed in an interior of the spindle or the like. This causes problems that the production costs are increased and that the noise level is increased due to the use of compressed air.

Figure 10:
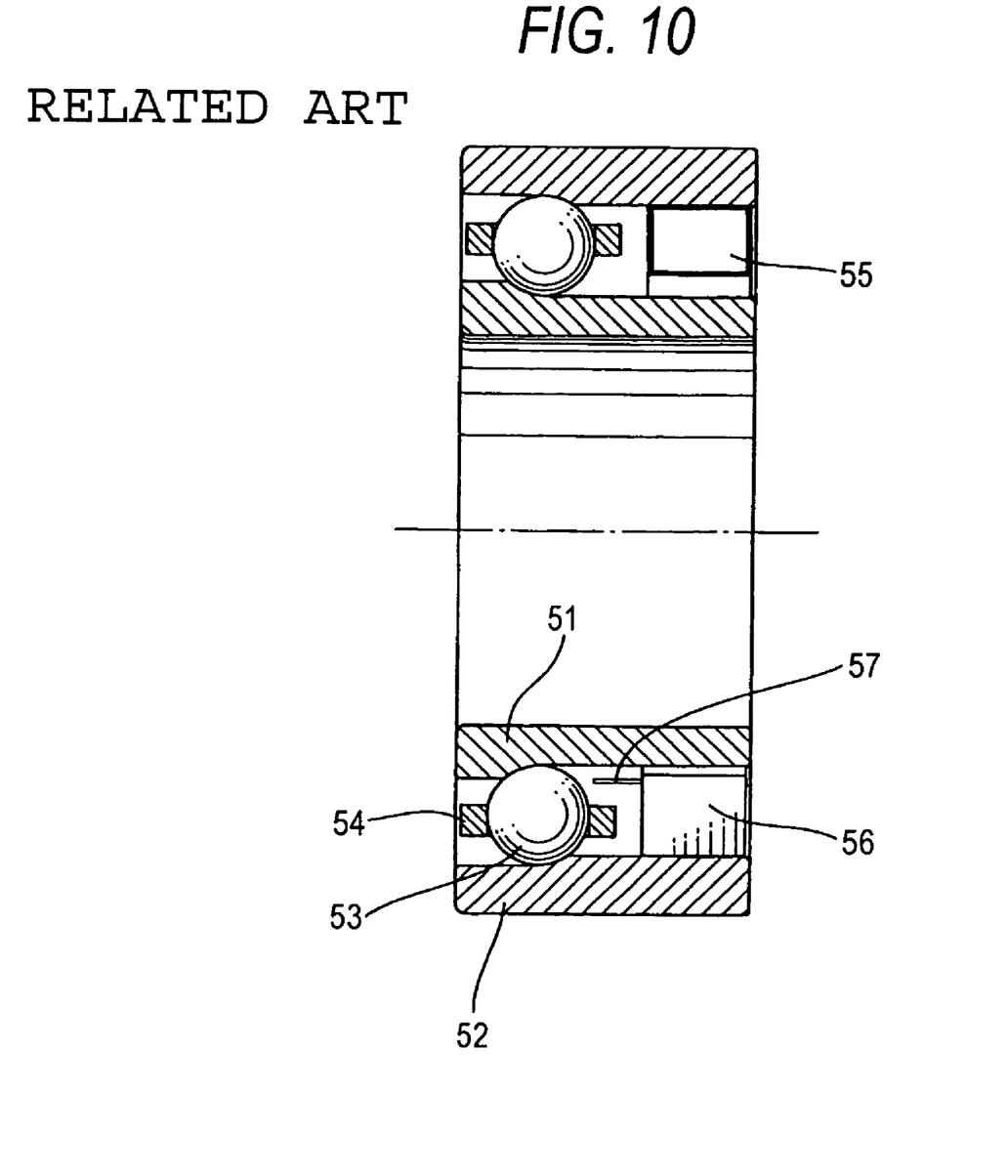
FIG. 10 is an axially parallel sectional view which shows a configuration example of a conventional rolling bearing device including a self-lubricating function.
Figure 11:
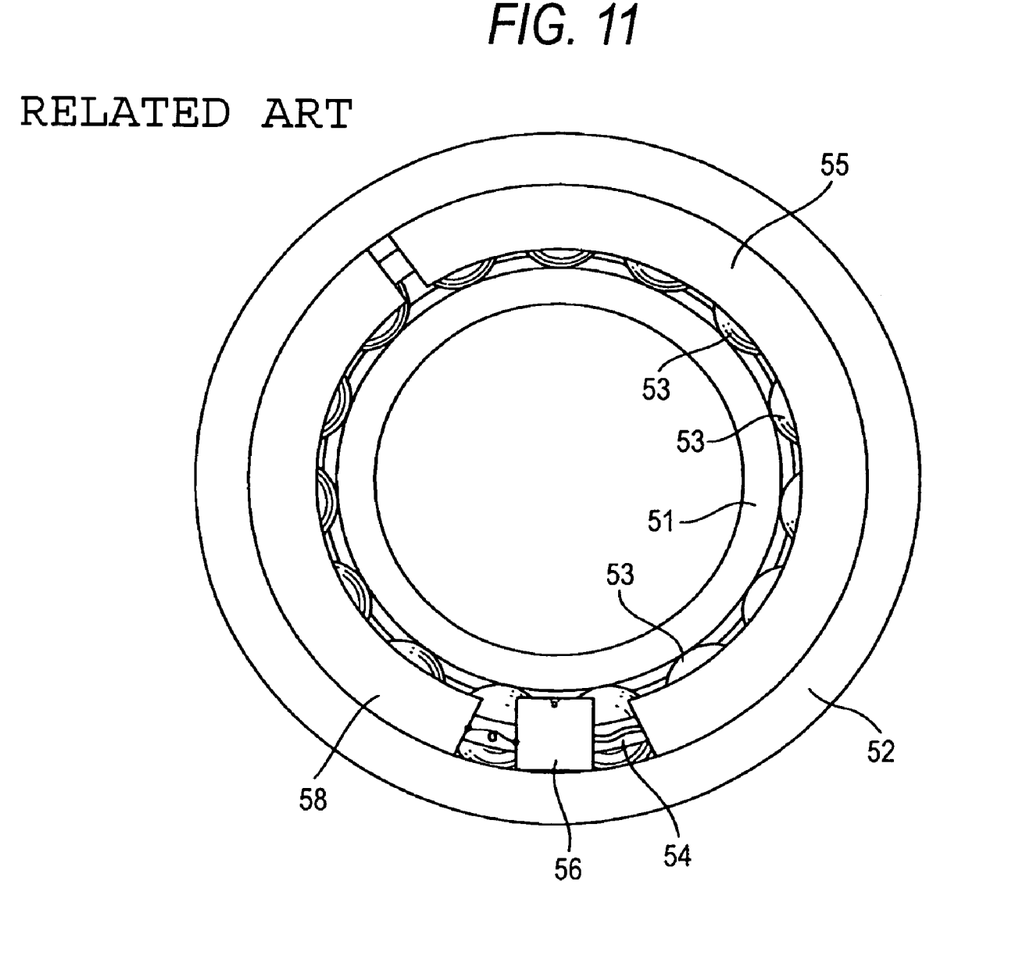
FIG. 11 is a front view of the conventional rolling bearing which results when viewed from the right in FIG. 10.

With a view to solving the problems, there have been proposed rolling bearing devices in which a lubricating oil supply mechanism is incorporated in an interior of a rolling bearing (refer, for example, to Patent Document Nos. 1, 2). A practical configuration example of the rolling bearing which a lubricating oil supply mechanism is incorporated incorporates therein is shown in FIGS. 10 and 11. FIG. 10 is an axially parallel sectional view, and FIG. 11 is a front view which results when viewed from the right in FIG. 10. In this example, a rolling bearing includes an inner ring 51, an outer ring 52 and a plurality of rolling elements 53 disposed in such a manner as to freely roll in such a state that they are held at constant intervals in a circumferential direction between the inner ring 51 and the outer ring 52 by a cage 54, and an oil supply unit made up of a tank 55 for storing therein lubricating oil, a pump 56 for sucking out to discharge the lubricating oil stored in the tank 55, a nozzle 57 mounted at a discharge port of the pump 56 and made to extend to the vicinity of the rolling element 53 within an annular space defined between the inner ring 51 and the outer ring 52 in such a manner as to be made to open thereat and a drive circuit 58 including a power supply battery for the pump 56 is constructed to be fixed to an inner circumferential surface of a stationary ring, for example, the outer ring 52 of the rolling bearing, so as to supply an extremely minute amount, for example, several tens of nl/min, of lubricating oil from the opening at a distal end of the nozzle 57 to the inside of an air curtain formed when the rolling bearing rotates.

According to the proposed techniques, since the lubricating oil is supplied to the inside of the air curtain generated when the rolling bearing rotates, compressed air, which is required as a carrier in the case of the oil-air lubricating method, is no longer necessary, and hence, the noise problem can be solved, and additionally, the compressor, the oil-air lubricating unit, and furthermore, the external piping and the internal piping are also no longer necessary, which makes the proposed techniques advantageous in costs, as well.

Patent Document No. 1: JP-A-2004-108388
Patent Document No. 2: JP-A-2004-316707

DISCLOSURE OF THE INVENTION

Problem that the Invention is to Solve

Incidentally, in the rolling bearing which includes the lubricating mechanism that has been described above, it is a crucial matter to solve a problem of how to cause the extremely minute amount of lubricating oil to efficiently contribute to lubrication of the rolling bearing. Namely, although almost all the lubricating oil supplied from the opening at the distal end of the nozzle is desirably supplied between the bearing ring and the rolling element and the rolling element and an inner circumferential surface of the pocket in the cage, since disturbance to airflow and negative pressure are generated in the interior of the rolling bearing due to rotation thereof, even though the nozzle is made to open in the vicinity of the rolling element in the interior of the rolling bearing, there sometimes occurs a case where it becomes difficult to supply the lubricating oil accurately to the locations described above.

The invention has been made in view of the situations, and an object thereof is to provide a rolling bearing device which can introduce lubricating oil to locations on the rolling bearing which are suitable for lubrication of the rolling bearing such as locations between the rolling elements and the bearing rings or the rolling elements and inner circumferential surfaces of pockets in the cage in a more ensured fashion when compared with the conventional rolling bearing device having a self-lubricating function.

Means for Solving the Problem

With a view to attaining the objects, according to the invention, there is provided a rolling bearing device comprising:

an inner ring and an outer ring;

a plurality of rolling elements which are rollably disposed between the inner ring and the outer ring;

a cage which is provided between the inner ring and the outer ring, and formed with a plurality of pockets for accommodating the plurality of rolling elements, respectively, and a groove which extends, on one end face side of the cage, circumferentially along a full circumference of the cage about a rotational center thereof, communicates with the plurality of pockets and includes a bottom portion;

a nozzle having a distal end portion inserted into the groove; and a pump communicating with a tank for storing lubricating oil for supplying the lubricating oil stored within the tank to the rolling element via the nozzle.

Here, in the invention, the groove can be configured as follows when viewed in its cross section. That is, a configuration can preferably be adopted in which the groove expands more towards the outer ring as it approaches the rolling elements, and a configuration can also preferably adopted in which the groove extends closer to the outer ring as it approaches the rolling elements.

The invention is such as to solve the problem by forming the circumferential groove which communicates individually with the pockets and causing the nozzle to be inserted into the groove at its distal end for supply of lubricating oil.

Namely, in the invention, the groove is provided on the one end face of the cage in such a manner as to extend circumferentially about the rotational center of the cage, the groove is made to communicate individually with the pockets through a bottom surface thereof, and the distal end of the nozzle is inserted into the groove from the one end face side. This configuration creates a state in which the opening at the distal end of the nozzle communicates individually with interiors of the pockets. According to the configuration, when the rolling bearing rotates, since there is caused no difference in speed between an opening in the cage which lies on the nozzle inserting side thereof and openings in the pockets, there is produced little disturbance to airflow and negative pressure in the portion of the groove where the nozzle is made to open, whereby the lubricating oil supplied from the opening at the distal end of the nozzle reaches the rolling element in an ensured fashion, and almost all the lubricating oil so supplied contributes to lubrication of the rolling bearing.

In addition, as viewed in its cross section, the groove is caused to expand more towards the outer ring as it approaches the rolling elements, or the groove is caused to extend closer to the outer ring as it approaches the rolling elements, whereby an airflow directed towards the rolling elements is generated within the groove by virtue of centrifugal force, and the lubricating oil supplied from the opening at the distal end of the nozzle is caused to move towards the rolling elements in an ensured fashion.

Advantage of the Invention

According to the invention, in the rolling bearing including the nozzle which is inserted between the inner ring and the outer ring of the bearing in such a manner as to be made to open in the annular space defined therebetween and the pump for supplying the lubricating oil stored in the tank via the nozzle, since the groove is formed on the one end face side of the cage which holds the rolling elements at the constant intervals by accommodating them individually in the pockets between the inner ring and the outer ring in such a manner as to extend circumferentially along the full circumference thereof and to communicate individually with the pockets and the nozzle is inserted into the groove so formed at the distal end thereof, the state is produced at the opening at the distal end of the nozzle in which disturbance to airflow and negative pressure are difficult to be produced when compared with the conventional rolling bearing with the self-lubricating function, whereby the lubricating oil supplied from the opening at the distal end of the nozzle is allowed to reach the rolling elements in an ensured fashion for contribution to lubrication of the rolling bearing, and hence, the rolling bearing can efficiently be lubricated by supplying a small amount of lubricating oil. As a result, with an oil supply unit in which a tank cannot be refilled with lubricating oil, the life of lubricating oil stored in the tank can be extended, whereas with an oil supply unit in which a tank can be refilled with lubricating oil, an interval at which lubricating oil is refilled can be extended.

1: angular ball bearing; 11, 110: inner ring; 12, 120: outer ring; 13: rolling element; 14, 140: cage; 14a, 140a: pocket; 14b, 140b: groove; 14c: opening; 14d: outer side wall; 2: inner ring spacer; 3: outer ring spacer; 4: oil supply unit; 41: tank; 42: pump; 43: nozzle; 44: drive circuit

BEST MODE FOR CARRYING OUT THE INVENTION

Hereinafter, embodiments of the invention will be described by reference to the drawings.

Figure 1:
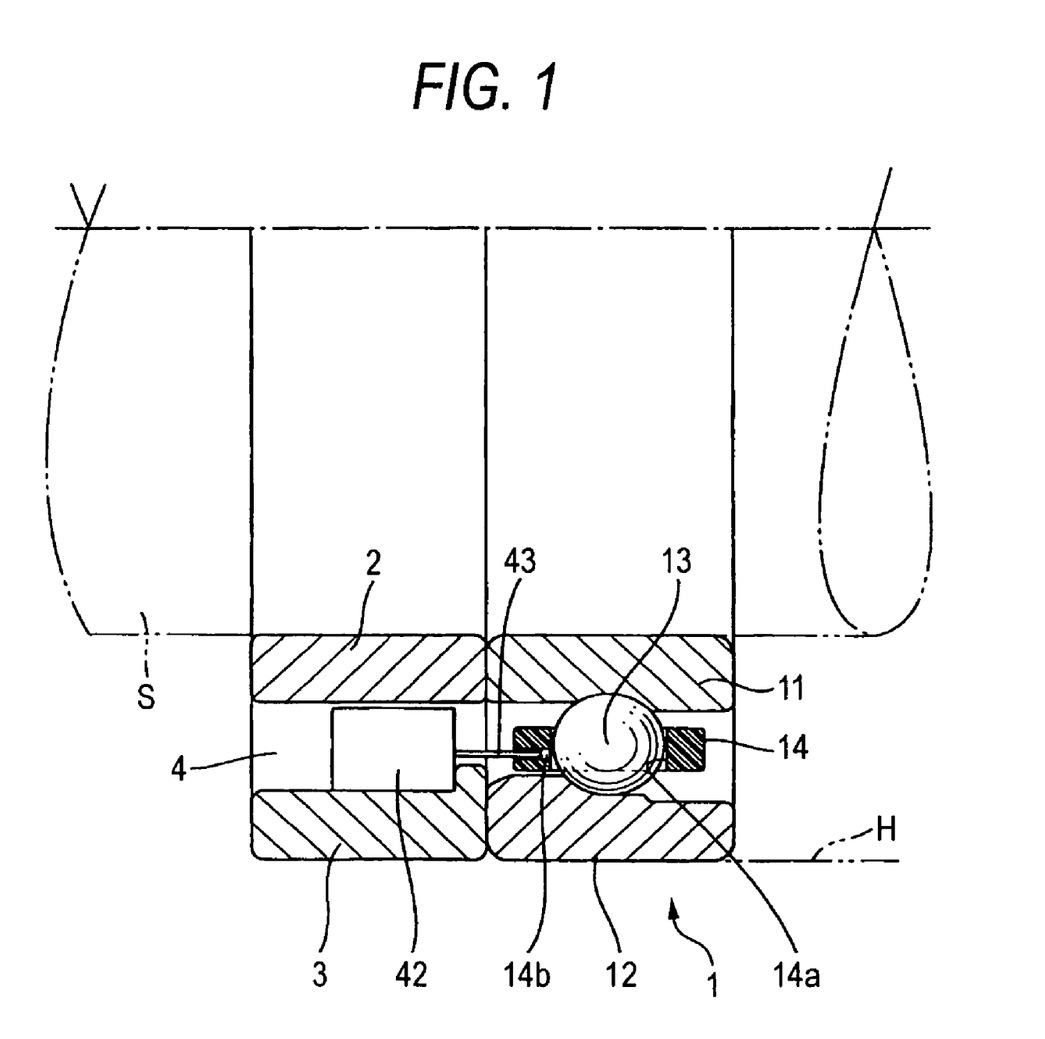
FIG. 1 is an axially parallel sectional view of an embodiment in which the invention is applied to an angular ball bearing.
Figure 2:
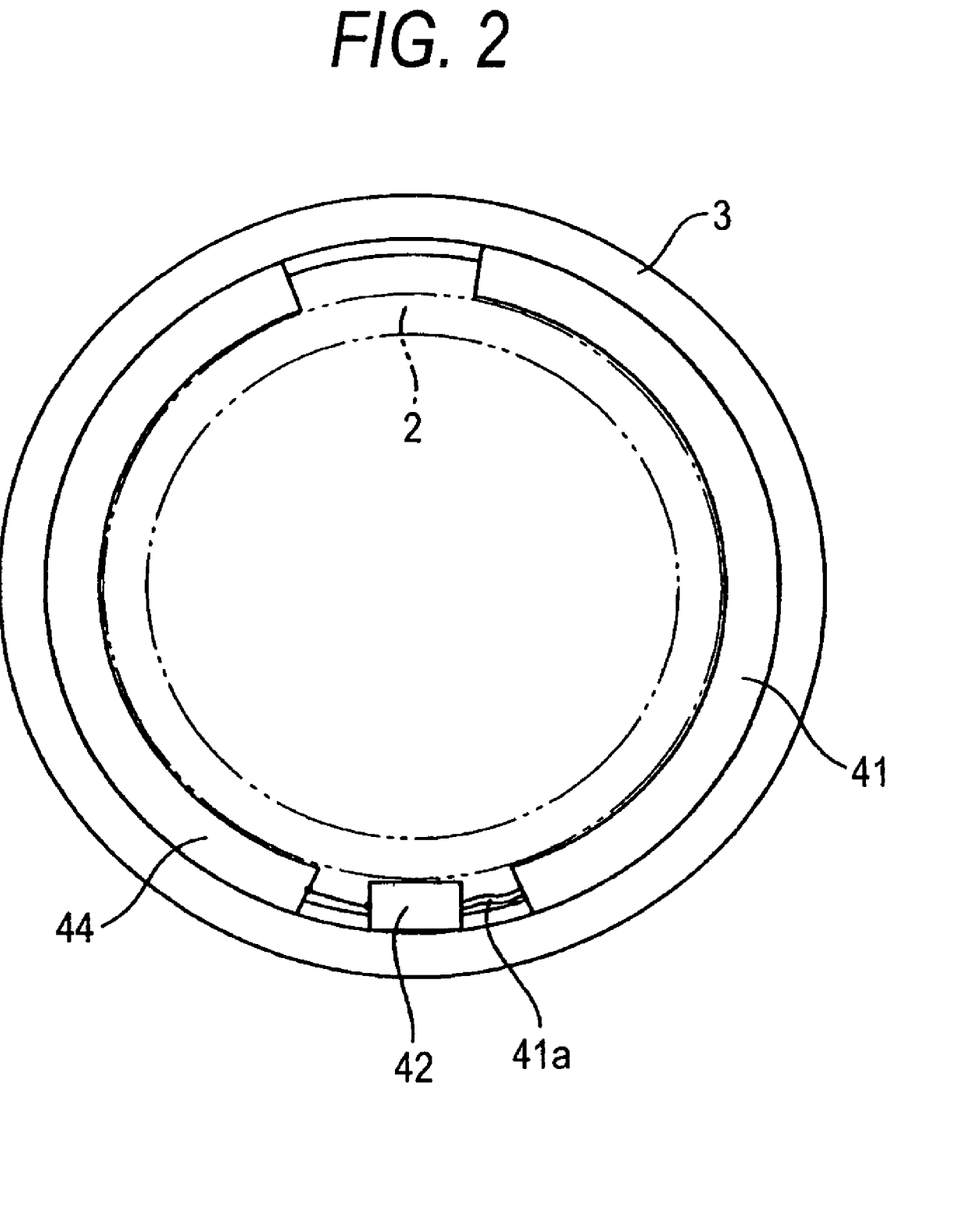
FIG. 2 is a front view of an outer ring spacer 3 in the embodiment shown in FIG. 1, which results when viewed from the left in FIG. 1.

FIG. 1 is an axially parallel sectional view of an embodiment in which the invention is applied to an angular ball bearing, and FIG. 2 is a front view of an outer ring spacer 3 of the angular ball bearing which results as viewed from the left in FIG. 1.

This embodiment shows an example in which an oil supply unit 4 is disposed on, of an inner ring spacer 2 and the outer ring spacer 3 which are disposed adjacent to each other in an angular ball bearing 1, the outer ring space 3 which constitutes a spacer on a stationary side of the bearing 1. The angular ball bearing 1 has a construction in which a plurality of rolling elements (balls) 13 are held at predetermined intervals in a circumferential direction between an inner ring 11 and an outer ring 12 while being accommodated individually in a plurality of pockets 14a formed in a cage 14, and in this embodiment, the outer ring 12 is incorporated in a housing H as a stationary ring, and a shaft S is fixed to an inner circumferential surface of the inner ring 11.

The oil supply unit 4 is made up mainly of a tank 41 for storing lubricating oil, a pump 42 which communicates with the tank 41 via a pipe 41a in such a manner as to suck out and discharge the lubricating oil stored in the tank 41, a nozzle 43 which is mounted at a discharge port of the pump 42 and a drive circuit 44 for the pump 42, and these constituent members of the oil supply unit 4 are fixed to an inner circumferential surface of the outer ring spacer 3 therealong. The nozzle 43 is inserted in a groove 14b formed in a cage at a distal end portion thereof as will be described later on.

Figure 3:
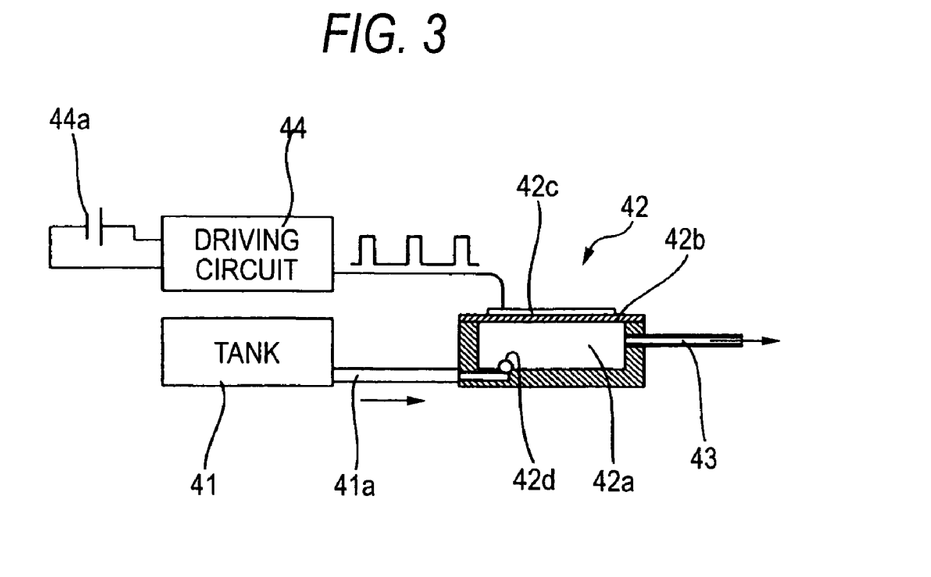
FIG. 3 is a drawing showing an overall configuration of an oil supply unit 4 in the embodiment of the invention, in which an exemplary diagram representing a mechanical configuration and a block diagram representing an electrical configuration are shown together.

An overall configuration example of the oil supply unit 4 is shown in FIG. 3 where an exemplary diagram showing a mechanical configuration and a block diagram showing an electrical configuration are shown together.

The pump 42 is made up of a pump chamber 42a, a diaphragm 42b which forms one wall portion of the pump chamber 42a, a piezoelectric element 42c affixed to the diaphragm 42b and a check valve 42d which is provided at a connecting portion between the pump chamber 42a and the pipe 41a. The drive circuit 44 includes a power supply battery 44a and supplies, for example, a rectangular voltage signal to the piezoelectric element 42c. In this configuration, when a rectangular voltage signal is applied to the piezoelectric element 42c, the diaphragm 42b is displaced vertically as viewed in the figure. When the diaphragm 42b is displaced upwards, lubricating oil in the tank 41 is sucked into the pump chamber 42a via the check valve 42d and the pipe 41a, whereas when the diaphragm 42b is, following the upward displacement thereof, displaced downwards, the lubricating oil within the pump chamber 42a is discharged towards the nozzle 43 so as to be supplied from the distal-end opening 43a of the nozzle 43 towards the cage 14. When the lubricating oil is discharged by the pump 42, the lubricating oil inside the pump chamber 42a is prevented from returning to the pipe 41a side in any case by virtue of the existence of the check valve 42d. An amount of lubricating oil that is to be supplied to the angular ball bearing 1 is an extremely minute amount of the order of 30 nl/min. In addition, depending upon utilization conditions, the supply amount of lubricating oil can be changed to several hundreds of pl to several hundreds of nl/min.

Figure 4:
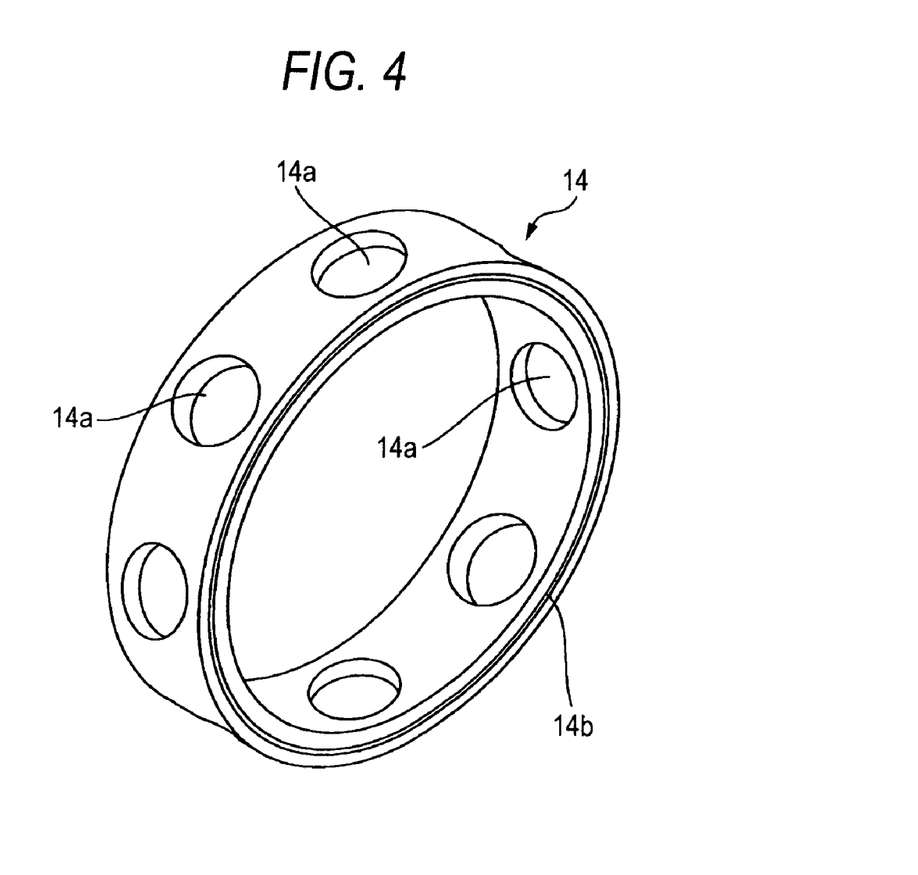
FIG. 4 is a perspective view of a cage 14 in the embodiment of the invention.
Figure 5:
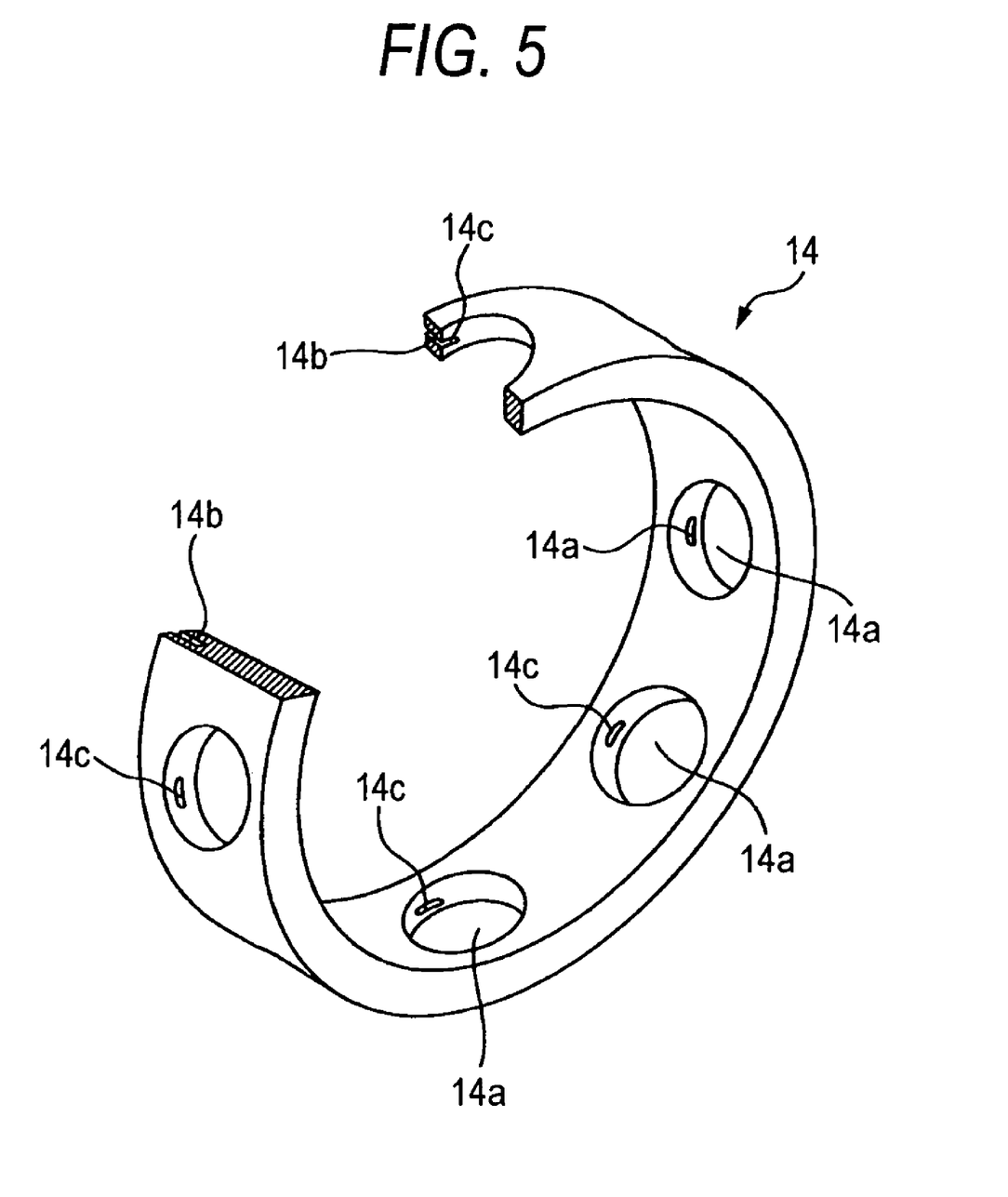
FIG. 5 is a partially cutaway view of the same cage 14 in the embodiment of the invention, which results when viewed from an opposite end side to that shown in FIG. 4.

The retainer 14 of this embodiment is a resin machined cage, and as is shown in FIG. 4, which is a perspective view of the cage, and FIG. 5, which is a partially cutaway view thereof as viewed from an opposite end face side to FIG. 4, a groove 14b is formed on one end face side of the cage in such a manner as to extend circumferentially along a full circumference of the cage about a rotational center thereof. This groove reaches the pockets 14a at a bottom portion thereof and are then made to open individually towards interiors of the pockets 14a. Reference numeral 14c in FIG. 5 denotes an opening in the groove 14b in an inner circumferential surface of the pocket 14a. The nozzle 43 is then inserted into the groove 14b from the one end face side of the cage 14 with a slight gap provided therebetween to reach the vicinity of the bottom portion of the groove 14b, in other words, the opening 14c in the inner circumferential surface of the pocket 14a at the opening at the distal end thereof and is made to open thereat.

According to the configuration that has been described heretofore, the rolling elements 13 roll while rotating on their axes when the inner ring 11 of the angular bearing 1 rotates, and the cage 14 also rotates in association with the rolling of the rolling elements 13. Since the opening at the distal end of the nozzle 43 is situated within the groove 14b of the cage 14, there is produced almost no disturbance to airflow that would otherwise be produced in association with rotation of the angular bearing 1 in the vicinity of the opening of the nozzle, and in there it is difficult for negative pressure to be produced. Consequently, almost all the lubricating oil that is supplied from the opening at the distal end of the nozzle reaches the rolling elements 13 through the openings 14c which communicate the pockets 14a at the bottom portion of the groove 14b, so as to contribute to lubrication of the angular ball bearing 1, thereby making it possible to lubricate the angular ball bearing 1 efficiently by supplying a small amount of lubricating oil.

Here, in the event that the configuration of the groove 14b is devised to form an airflow directed towards the rolling elements 13 within the groove 14b by virtue of rotation of the angular ball bearing 1, the lubricating oil supplied from the nozzle 43 can be caused to adhere to the rolling elements in a more ensured fashion. Embodiments of such configurations will be shown in axially parallel sectional views in FIGS. 6 and 7.

Figure 6:
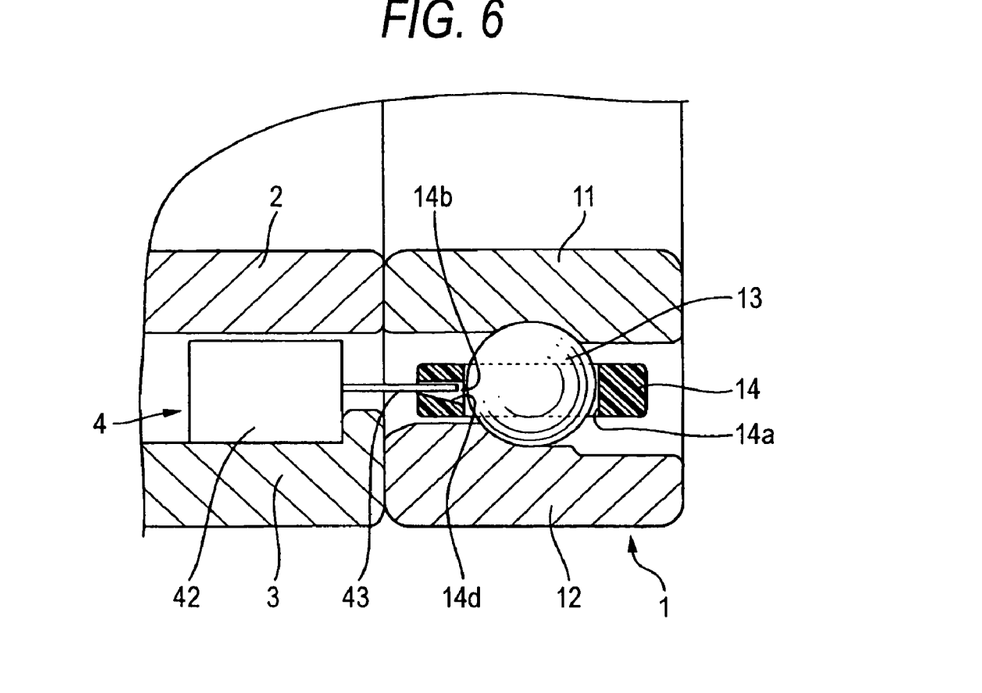
FIG. 6 is an axially parallel sectional view of a main part of another embodiment of the invention.

In an embodiment shown in FIG. 6, an external side wall or a side wall 14b facing the outer ring 12 of both side walls of a groove 14b formed in a cage 14 is made into a wall which is inclined more outwards as it approaches the rolling elements 13. In the groove 14b having such a sectional shape, an airflow is produced to be directed towards the rolling elements 13 along the outwardly inclined side wall 14d by virtue of rotation of the cage 14 associated with rotation of the angular ball bearing 1, whereby the lubricating oil that is supplied from the opening at the distal end of the nozzle 43 flows along the airflow to reach the rolling elements 13 in an ensured fashion. In addition, with the side wall 14d which is inclined outwards, the lubricating oil adhering to the side wall 14d is directed towards the rolling elements 13 by virtue of centrifugal force generated in association with rotation of the cage 14, and therefore, in this respect, too, the efficient utilization of lubricating oil can be realized.

Figure 7:
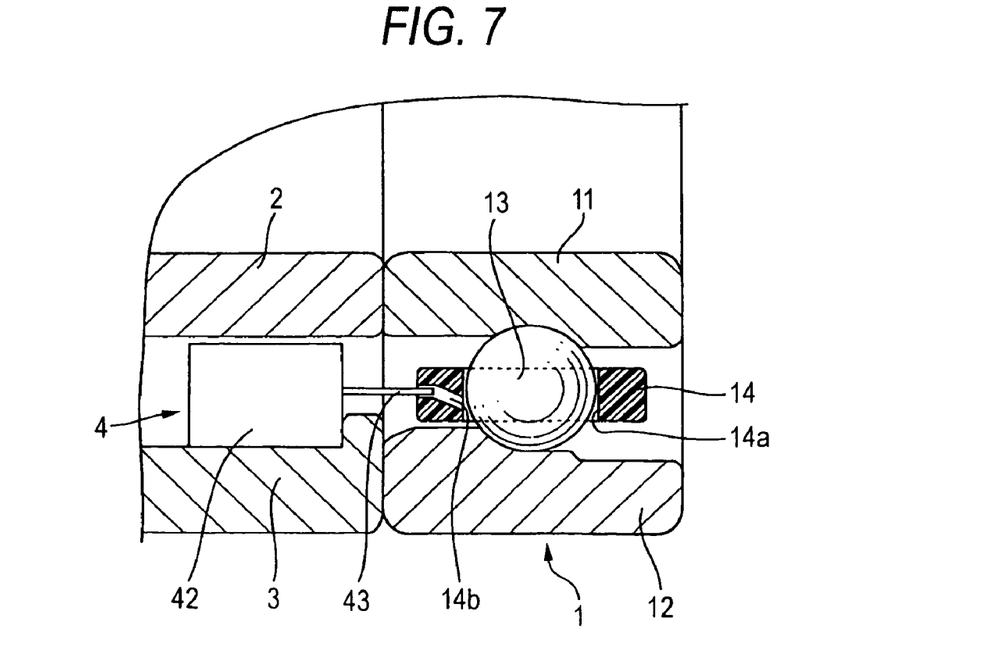
FIG. 7 is an axially parallel sectional view of a main part of a further embodiment of the invention.

On the other hand, in an embodiment shown in FIG. 7, in order for a groove 14b formed in a cage 14 to be caused to extend closer to the outer ring 12 as it approaches the rolling elements 13, at least a portion of the groove 14b which lies close to the rolling elements 13 is inclined outwards. Even in the event that both side walls of the groove 14b are made to extend closer to the outer ring 12 altogether, as with the above example, an airflow which is directed towards the outer ring 12 is also produced within the groove 14b, and lubricating oil is made to easily reach the rolling elements 13. In addition, since the lubricating oil which adheres to both the sides of the groove 14b is also directed towards the rolling elements 13, the efficient utilization of lubricating oil can be realized.

Figure 8:
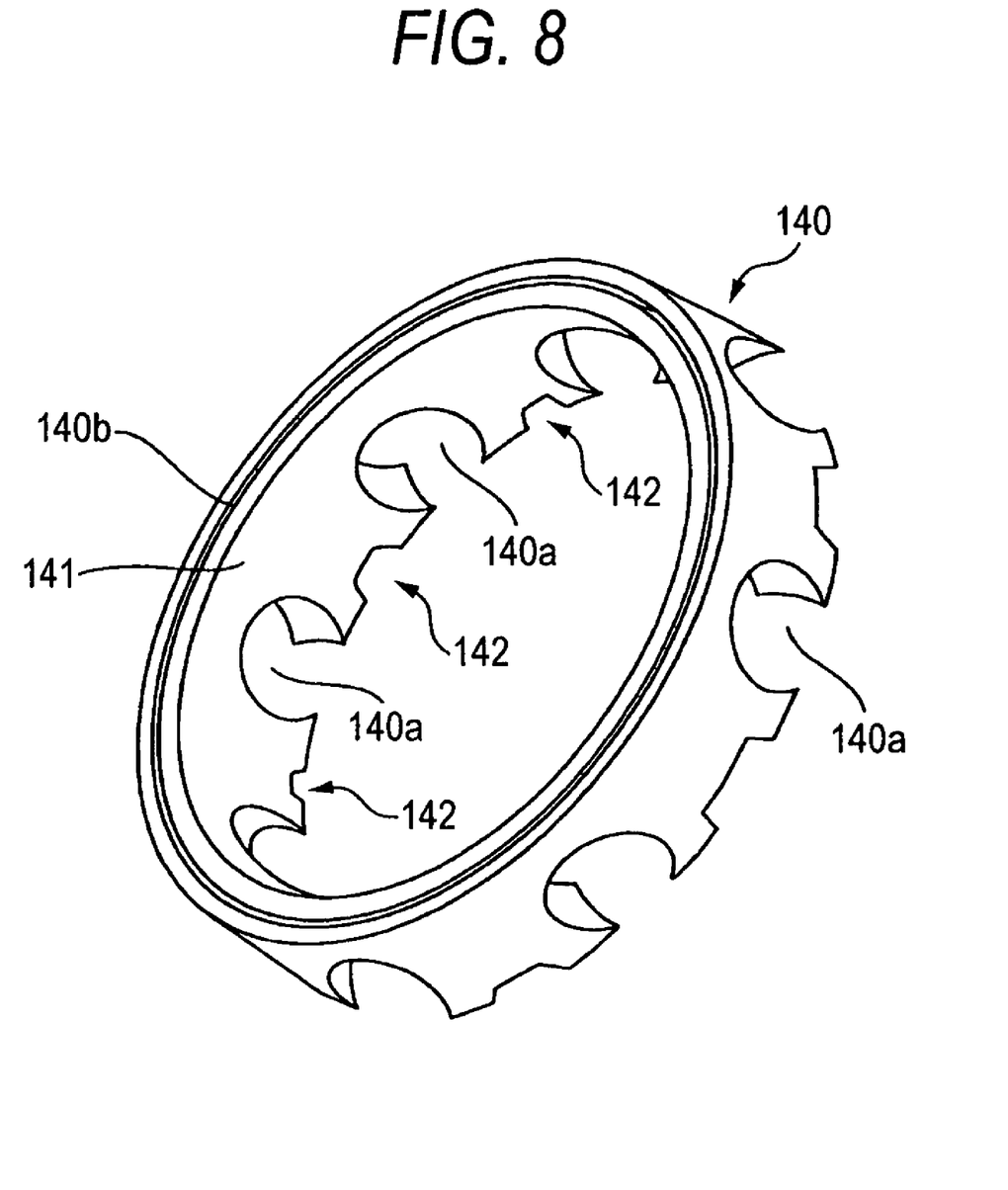
FIG. 8 is a perspective view showing a groove forming example when the invention is applied to a rolling bearing which utilizes a crown-type cage.

Here, in the respective embodiments, while the resin machined cage is described as being used as the cage 14, other different types of materials can of course be used such as brass and soft steel. In addition, the invention can also be applied to a crown-type cage. A perspective view in FIG. 8 shows an embodiment in which the invention is applied to the crown-type cage. This crown-type cage 140 is such as to have a construction in which pillar portions 142 are formed to project with a view to forming pockets 140a, and when the crown-type cage 140 as shown is used, a groove 140b may only have to be formed on an end face which lies on a base 141 side of the cage with a bottom portion of the groove 140b made to communicate individually with pockets 140a.

Figure 9:
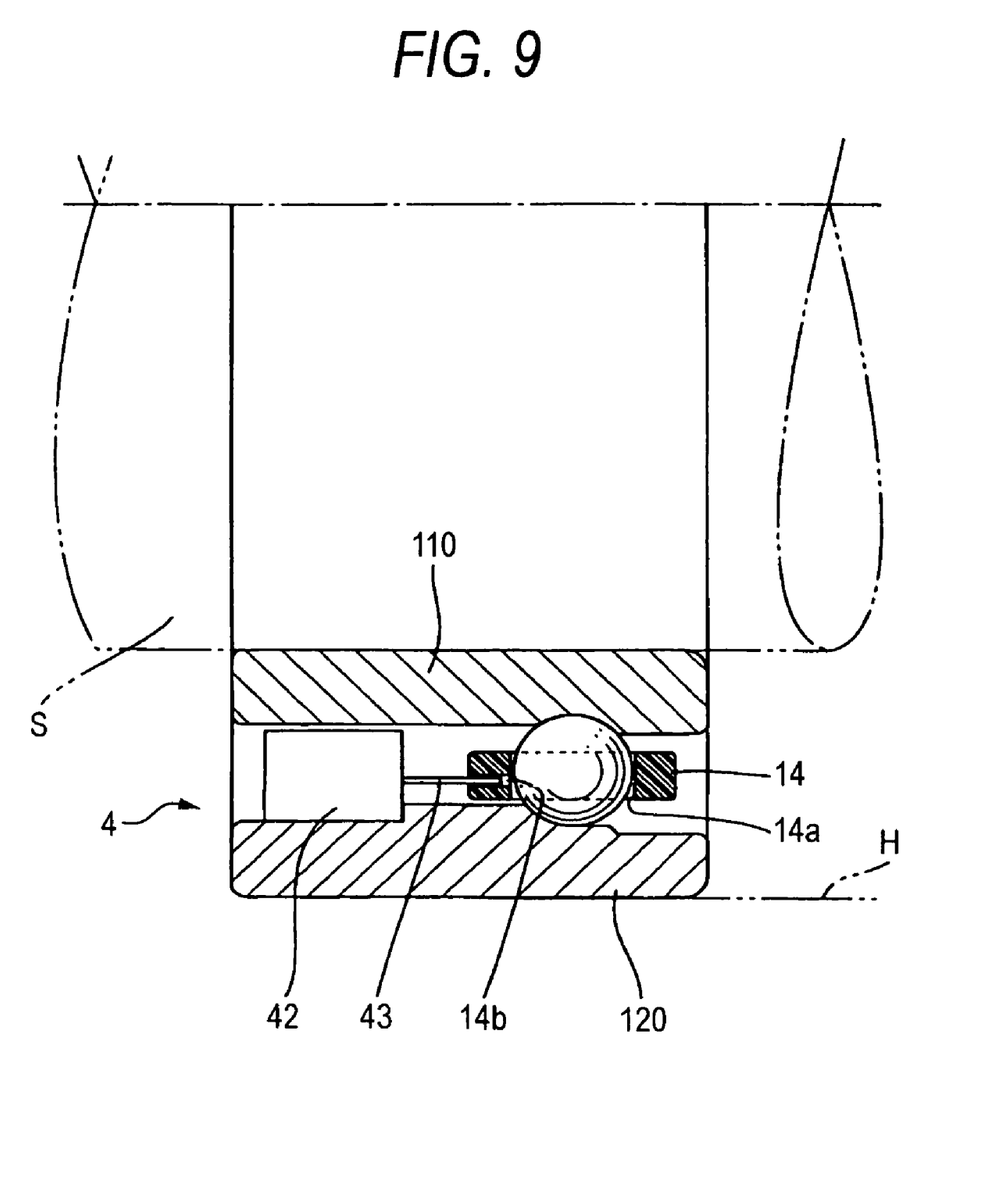
FIG. 9 is an axially parallel sectional view which shows an example in which an oil supply unit is incorporated in an interior of a rolling bearing itself.

In addition, in the embodiments that have been described heretofore, while the oil supply unit 4 is described as being fixed to the outer ring spacer 3, the oil supply unit 4 may be incorporated in the rolling bearing. FIG. 9 shows an axially parallel sectional view which shows such an embodiment. In the embodiment shown in FIG. 9, an inner ring 110 and an outer ring 120 are made to extend over the same distance on one axial end face side thereof when compared with a normal angular ball bearing, and a oil supply unit 4, which is similar to those described in the aforesaid embodiments, is incorporated in an annular space defined between the extended portions of the inner ring 110 and the outer ring 120. In this embodiment, the outer ring 120 is described as being used as a stationary ring, and therefore, the constituent members of the oil supply unit 4 are fixed to an inner circumferential surface of the outer ring 120. Also in this configuration, a groove 14b which is similar to those in the aforesaid embodiments is formed in the cage 14, and a nozzle 43 is inserted into an interior of the groove 14b so formed at a distal end portion thereof, thereby making it possible to provide the same function and advantage as those provided by the previous embodiments can be provided.

In addition, the invention can, of course, be applied equally to other rolling bearings than the angular ball bearing such as a deep-grooved ball bearing, a cylindrical roller bearing and a tapered roller bearing.

The invention claimed is:

1. A rolling bearing device comprising:

an inner ring and an outer ring;

a plurality of rolling elements being rollably disposed between the inner ring and the outer ring;

a cage being provided between the inner ring and the outer ring, including:

a plurality of pockets accommodating the plurality of rolling elements, respectively; and a groove extending, on one end face of the cage, circumferentially along a full circumference of the cage about a rotational center thereof, communicates with the plurality of pockets, and includes a bottom portion;

a nozzle comprising a distal end portion inserted into the groove;

a tank for storing lubricating oil; and a pump, communicating with the tank, for supplying the lubricating oil stored within the tank to a rolling element of the plurality of rolling elements via the nozzle, wherein a cross sectional shape of the groove is formed into a shape which expands more towards the outer ring as the groove approaches the rolling elements.

2. The rolling bearing device according to claim 1, wherein the groove extends in the axial direction of the rolling bearing towards the rolling elements.

3. The rolling bearing device according to claim 1, wherein the tank is disposed adjacent to the cage on a plane which extends through the cage in an axial direction.

* * * * *